United States Patent [19]

Hoffine et al.

[11] Patent Number: 4,911,576

[45] Date of Patent: Mar. 27, 1990

[54] METHOD FOR STORING TOXIC WASTE MATERIAL

[76] Inventors: Harold C. Hoffine, Box 213, Waverly, Kans. 66871; John Forsythe, 802 W. 15th; Leon Morgan, R.R. 5, Box 144, both of Emporia, Kans. 66801

[21] Appl. No.: 360,097

[22] Filed: Jun. 1, 1989

Related U.S. Application Data

[62] Division of Ser. No. 263,395, Oct. 27, 1988.

[51] Int. Cl.[4] .................................... B09B 1/00

[52] U.S. Cl. .................................... 405/128; 405/53; 405/129

[58] Field of Search .................... 405/52, 53, 128, 129, 405/138, 150, 132; 52/169.6; 252/626, 628, 633

[56] References Cited

U.S. PATENT DOCUMENTS

| | | | |
|---|---|---|---|
| 2,318,154 | 5/1943 | Gooder | 405/128 |
| 3,665,716 | 5/1972 | Rogers et al. | 405/128 |
| 4,320,028 | 3/1982 | Leuchtag | 405/128 X |
| 4,725,164 | 2/1988 | Sagefors | 405/128 |

*Primary Examiner*—Dennis L. Taylor
*Attorney, Agent, or Firm*—John W. Carpenter

[57] ABSTRACT

A method for disposing of, confining, and isolating toxic waste material, which includes forming a plurality of housings underneath the surface of the earth. The housings are interconnected by a tunnel housing. At least one of the housings has a silo having a silo door that slidably opens and closes. The toxic waste is passed through the silo, through the silo housing and the tunnel housing, and into the other subterranean housing wherein the toxic waste is disposed. The silo door is then closed in order to enclose, confine, and isolate the toxic waste material.

10 Claims, 5 Drawing Sheets

METHOD FOR STORING TOXIC WASTE MATERIAL

This is a divisional application of copending application No. 263,395 filed Oct. 27, 1988.

BACKGROUND OF THE INVENTION

1. Field of the Invention

This invention is related to a method for storing toxic waste material. More specifically, this invention provides a method for disposing of, confining, and isolating toxic waste material.

2. Description of the Prior Art

A patentability investigation was conducted and the following U.S. patents were discovered: U.S. Pat. Nos. 4,040,480 to Richards; 4,189,254 to Akesson; 4,326,820 to Uerpmann et al.; 4,428,700 to Lennemann; 4,430,256 to Rustum and 4,500,227 to Courtois et al. None of the foregoing prior art patents teach or suggest the particular method for disposing of, confining, and isolating toxic waste material taught in the present invention.

SUMMARY OF THE INVENTION

The present invention accomplishes its desired objects by broadly providing a method for disposing of, confining, and isolating toxic waste material. Initially, a pair of subterranean excavations are formed and are interconnected with a subterranean tunnel. A subterranean housing means is formed and positioned within one of the subterranean excavations. Similarly, another subterranean housing means is formed within the other subterranean excavation. One of the subterranean housing means has a silo means extending to the surface of the earth. The silo means has a silo door that can slidably close and open to expose the inside of the silo means to the atmosphere. A tunnel housing means is extended through the subterranean tunnel from one subterranean housing means to the other subterranean housing means. The silo door means is open in order to expose the silo means and the attached subterranean housing means to the atmosphere. Toxic waste material (e.g. nuclear waste and the like) is passed through the silo means, through the attached housing means, through the tunnel housing means, and into the other subterranean housing means that communicates with the tunnel housing means. The toxic waste material is disposed or positioned in the latter subterranean housing means. Subsequently, the silo door means is closed in order to enclose, confine, and isolate the toxic waste material. Typically, the pair of subterranean housing means and the tunnel housing are filled with toxic waste in a sequential manner. More specifically, when one of the subterranean housing means is initially filled, then the tunnel means is initially filled, followed by the other housing means. After the pair of housing means and the tunnel housing means are full of toxic waste material, the silo means is filled with a filler (e.g. concrete or the like) in order to further enclose, confine, and isolate the toxic waste material and to protect the environment therefrom. After the silo means has been filled with the filler, the silo door means is closed to seal off the filler from the atmosphere.

It is therefore an object of the present invention to provide a method for disposing of, confining, and isolating toxic waste material, such as nuclear waste and the like.

This object, together with the various ancillary objects and features which will become apparent to those skilled in the art as the following description proceeds, are attained by this novel method of disposing of, confining, and isolating toxic waste material, a preferred embodiment being shown with reference to the accompanying drawings, by way of example only, wherein:

DETAILED DESCRIPTION OF THE INVENTION

Figure 1:
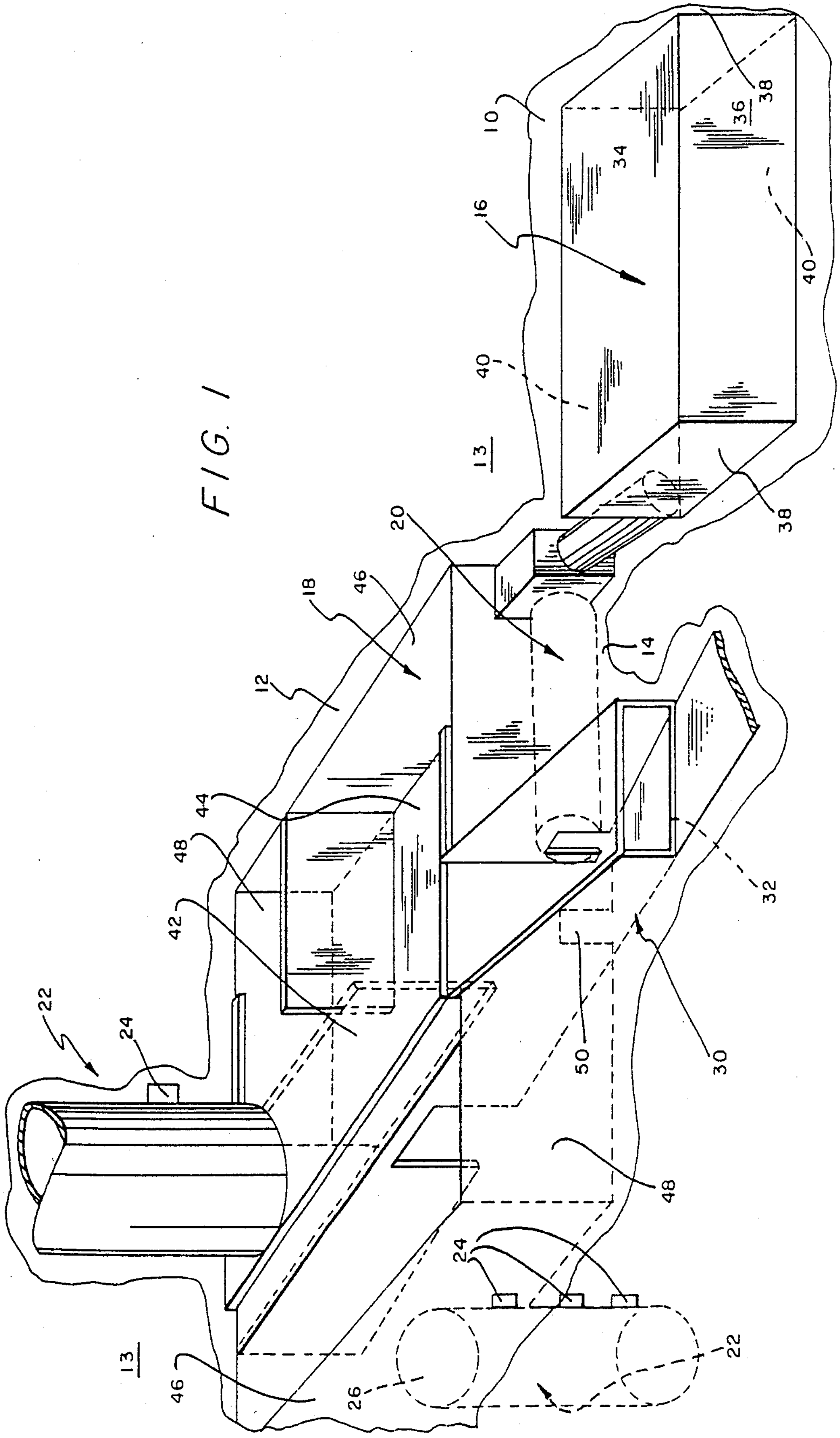
FIG. 1 is a partial perspective view of a pair of subterranean housings that are interconnected with a subterranean tube.

This invention provides for a method for disposing of, confining, and isolating toxic waste material, such as nuclear waste and the like. In order to dispose of, confine, and isolate such toxic waste, initially a pair of subterranean excavations 10 and 12 are formed within a subterranean formation 13 underneath the surface of the earth. The pair of subterranean excavations 10 and 12 are interconnected with or by a subterranean tunnel 14. Within the subterranean excavation 10 is disposed a subterranean housing means, generally illustrated as 16. Similarly, within the subterranean excavation 12 is disposed a subterranean housing means, generally illustrated as 18. Interconnecting the housing means 16 and 18 and passing through the subterranean tunnel 14 is a tunnel housing means which communicates with both of the subterranean housing means 16 and 18. Preferably, the tunnel housing means is L-shaped as best illustrated in FIG. 1.

Figure 4:
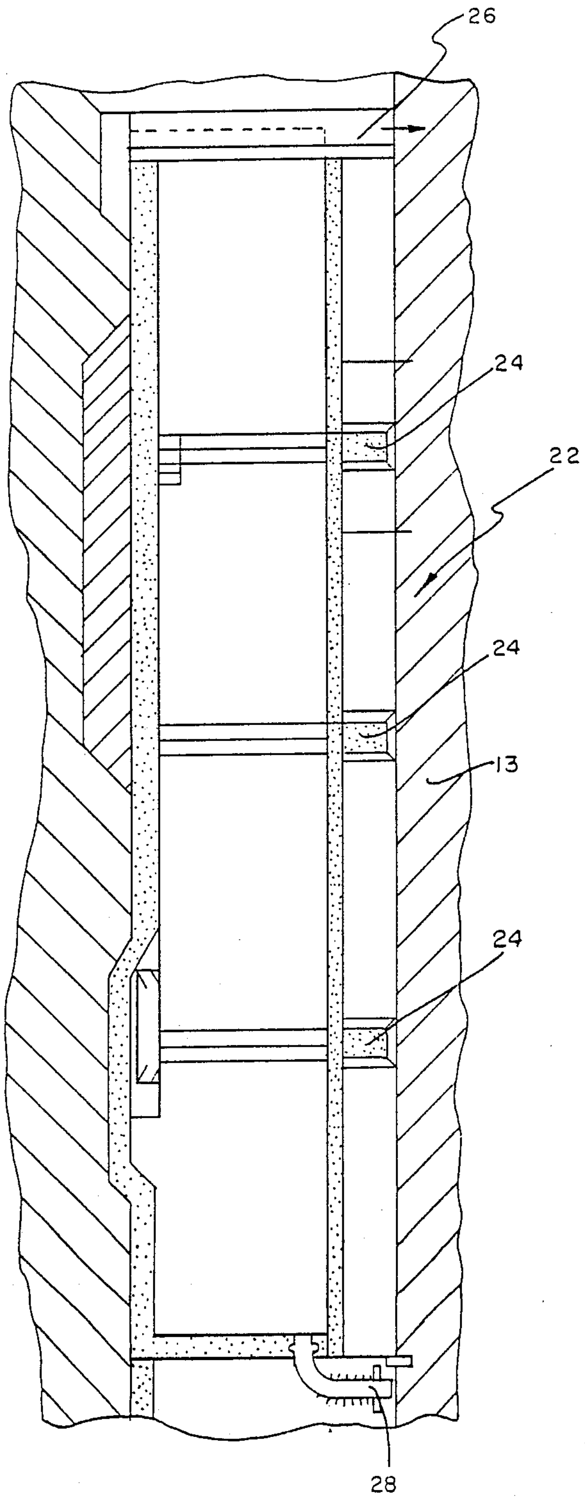
FIG. 4 is a partial vertical sectional view of the silo means that is mounted on one of the subterranean housings.

The subterranean housing means 18 is formed with a silo means, generally illustrated as 22. As best illustrated in FIG. 4, the silo means 22 is formed with a plurality of stirrup means 24 which extend out into the formation 13 in order to provide stability for the silo means 22. Slidably disposed over the silo means is a silo door 26 which can open and close. When door 26 is slid open, the inside of the silo means is exposed to atmospheric conditions. Extending from the bottom of the silo means 22 and communicating with the subterranean housing means 18 is a conduit 28. While the silo means 22 has been represented in FIG. 1 as being mounted on top of subterranean housing means 18, it should be understood that the spirit and scope of this invention would include the silo means 22 as extending below subterranean housing 18 such that when the silo door means 26 opens, the inside of the subterranean housing means communicates with the inside of the silo means 22. This embodiment of the invention is represented by dotted lines in FIG. 1. In the latter embodiment of the invention, the pair of subterranean housings 10 and 18, along with the tunnel housing 20, would still be disposed subterraneously with an entrance through a subterranean vestibule, generally illustrated as 30. The vestibule 30 has a door 32 which is accessible from the surface of the earth, such as through an underground passageway or tunnel leading thereto.

For the embodiment of the invention where the silo means 22 is disposed underneath the subterranean housing 18, the method for disposing of, confining, and isolating toxic waste material would comprise passing toxic waste material through the vestibule means, and either through the tunnel housing 20 and into the subterranean housing 16 for depositing therein or through subterranean housing 18 and into the silo means 22 (which for this embodiment would not include conduit 28) or into subterranean housing 18. The vestibule door 32 would then be closed in order to enclose and confine or isolate the toxic waste material within either the subterranean housing 16 (or the tunnel housing 20) or the subterranean housing 18 or the silo means 22.

The subterranean housing 16 and 18 along with the tunnel housing 20 and the silo means 22 are all preferably constructed of three- to twelve-foot thick reinforced concrete. The concrete is reinforced with one-inch thick steel rods. As best illustrated in FIG. 1, subterranean housing 16 has a roof 34, a floor 36, end walls 38—38, and side walls 40—40. The tunnel housing is cylindrically shaped, preferably L-shaped. The subterranean housing 18 similarly has a roof 42, a base 44, a pair of end walls 46—46 and a pair of side walls 48—48. Entrance into the subterranean housing 18 is through the vestibule means where a door 50 opens to allow entrance from the vestibule means into the subterranean housing 18. The vestibule means 30 is also preferably constructed of six- to twelve-foot thick concrete.

Coating the outside of the silo means 22, and the walls, tops, and bottoms of the subterranean housings 16 and 18, along with the cylindrical walls of the tunnel housing 20, is a composition which preferably comprises refined coal tar or bitumen, along with enamel. The bitumen for this composition comprises principally hydrocarbons and is substantially free of oxygenated bodies. The bitumen may include both asphalt and coal tar materials. The composition comprises 20% to 80% by weight bitumen and 20% to 80% enamel. The enamel preferably comprises pigments (e.g. iron oxides, etc.) dispersed in varnish or a resin vehicle. The resin vehicle may be an oil-resin mixture, or entirely a synthetic resin. In the event that the coating composition comprises bitumen, varnish, and a synthetic resin, the composition is heated after being applied to the aforementioned structures.

Figure 2:
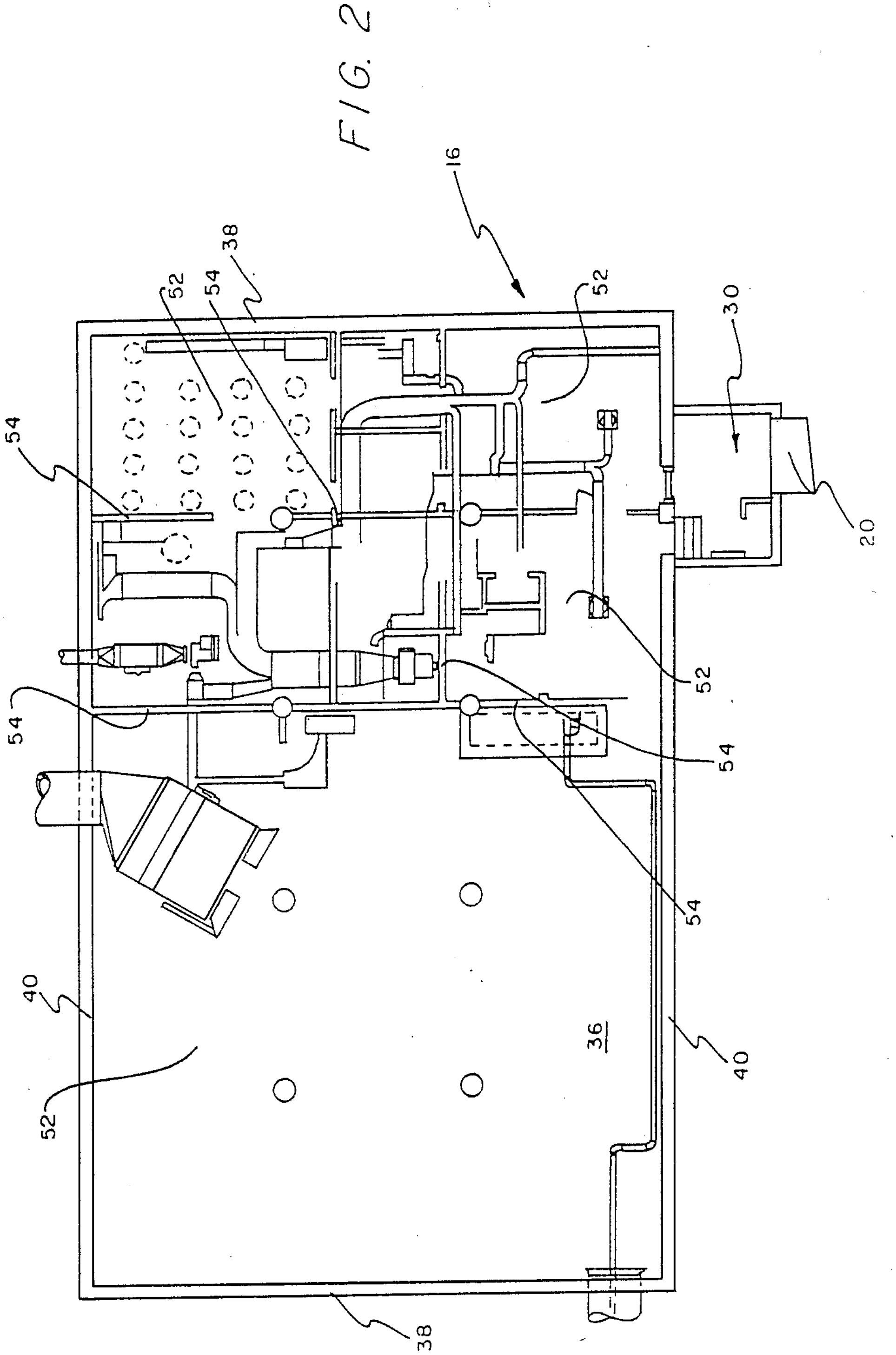
FIG. 2 is a top plan view of one of the subterranean housings.

The subterranean housing 16, in addition to having side walls 40—40 and end walls 38—38, additionally comprises a plurality of compartmentalized rooms 52. The rooms 52 are separated by a plurality of wall partitions 54 which are interconnected to define the plurality of compartments 52. The subterranean housing 16 may have other uses prior to depositing, confining, and isolating toxic waste material therein; such other uses include but are not limited to being a habitat where personnel may live and work to launch missiles from the silo means 22. In the event that the subterranean housing 16 is employed as a habitat for launching missiles, the subterranean housing 16 would also include the compartments 15 as being for launch operations, a mess, etc. As illustrated in FIG. 2, one of the compartments 52 would include a power plant and mechanical equipment along with various ventilation ducts wherethrough ventilation is conducted to be used for the personnel working in the subterranean housing 16. The housing 16 may also include a humidistat and a toilet, as well as a plurality of ducts that are positioned overhead in each of the compartments 52. It is readily apparent that in the event that the subterranean housing 16 is employed for depositing, confining, and isolating toxic waste material, such as radioactive material, the ventilation ducts, the toilet, the humidistat, the ducts, etc., will all have to be plugged or stopped or filled in with a suitable filler, such as a concrete mixture. The filler is preferably of the type that is described in U.S. Pat. No. 4,428,700, wherein the concrete is of the modified sulphur cement or concrete type which has been placed in a molten state into the various receptacles that are to be filled. Such modified sulphur cement is prepared by mixing together molten sulphur at a temperature of from about 120° C. to about 180° C. and from about 2 wt. % to about 40 wt. % (preferably from about 4 to about 8 wt. %) of a suitable organic modifier. The time that the sulphur and the organic modifier are mixed together may range from about one hour to about eight hours, preferably three to five hours. Suitable organic modifiers include cyclic hydrocarbons. More specifically, the suitable organic modifiers may be selected from the group consisting of dipentene, vinyltoluene, dicyclopentadiene, and mixtures thereof. The resulting modified sulphur cement or concrete product is poured while in the molten state into the appropriate receptacle (i.e. the humidistat, the ducts, the ventilation ducts, the toilet, etc.) and is allowed to cool into a solid. The concrete or the modified sulphur cement is employed to make the subterranean housing 16 airtight with respect to the surrounding atmosphere.

Figure 3:
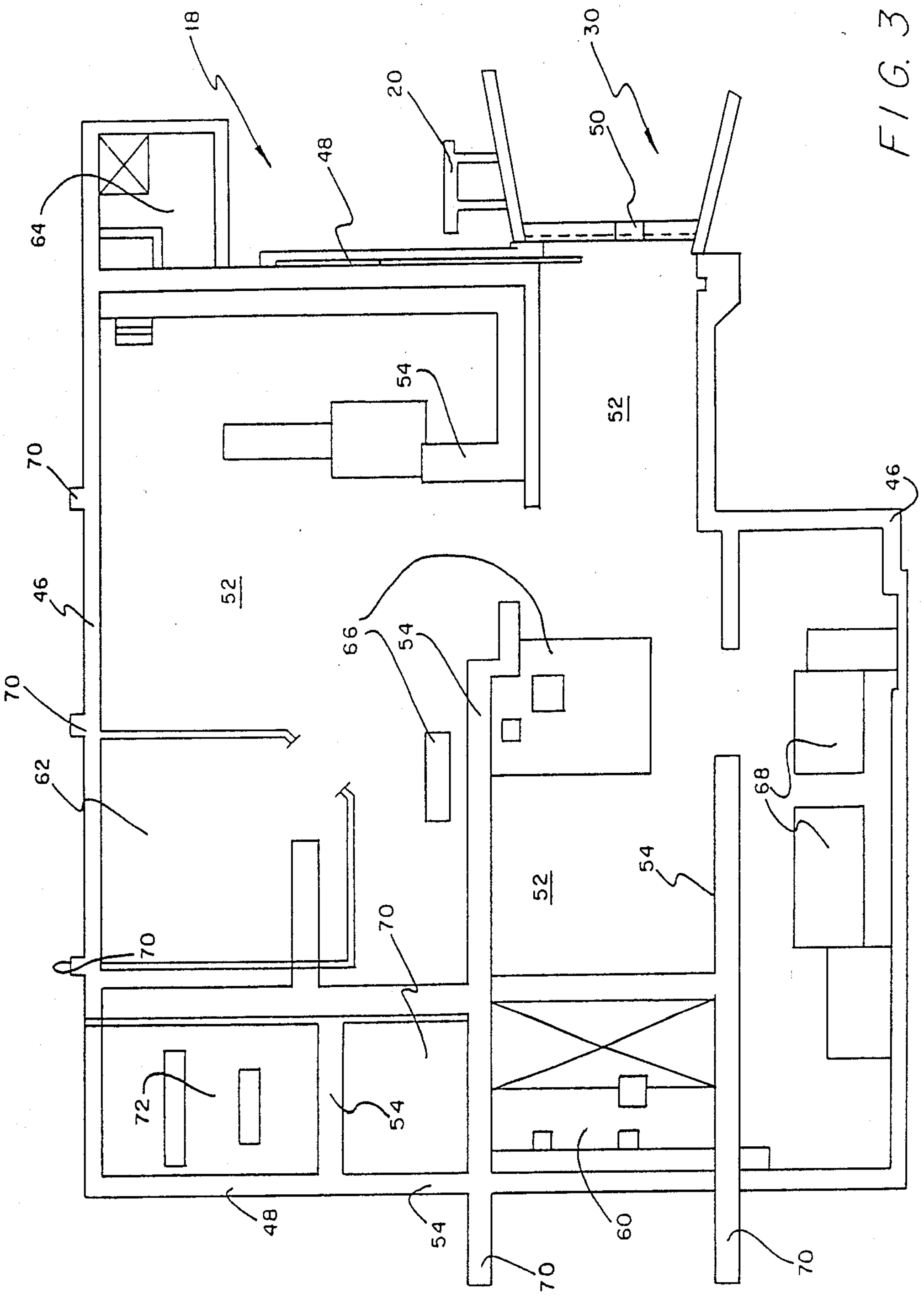
FIG. 3 is a top plan view of the other subterranean housing

The subterranean housing 18 (as best illustrated in FIG. 3) may also contain a plurality of compartmentalized spaces which are defined by a plurality of partitions 54 interconnected to form compartments 52. As was seen for the subterranean housing 16, the subterranean housing 18 may have other uses in addition to being a depository for toxic waste material. As previously indicated, the other uses may be as a housing where missiles may be launched from the silo 22 that is imposed over the housing 18. When used for such purposes of launching missiles, the subterranean housing 18 would include a blast or flame pit area 60, a fuel control area 62, a utility tunnel 64 for quick escape, a collimator pit 66, and various concrete pads 68. The subterranean housing 18 may additionally include various electrical platforms and a waste water area 72. The subterranean housing 18 may additionally include a plurality of stirrups 70 which are formed such as to be embedded in the formation 13 to give the subterranean housing stability while being embedded.

Figure 5:
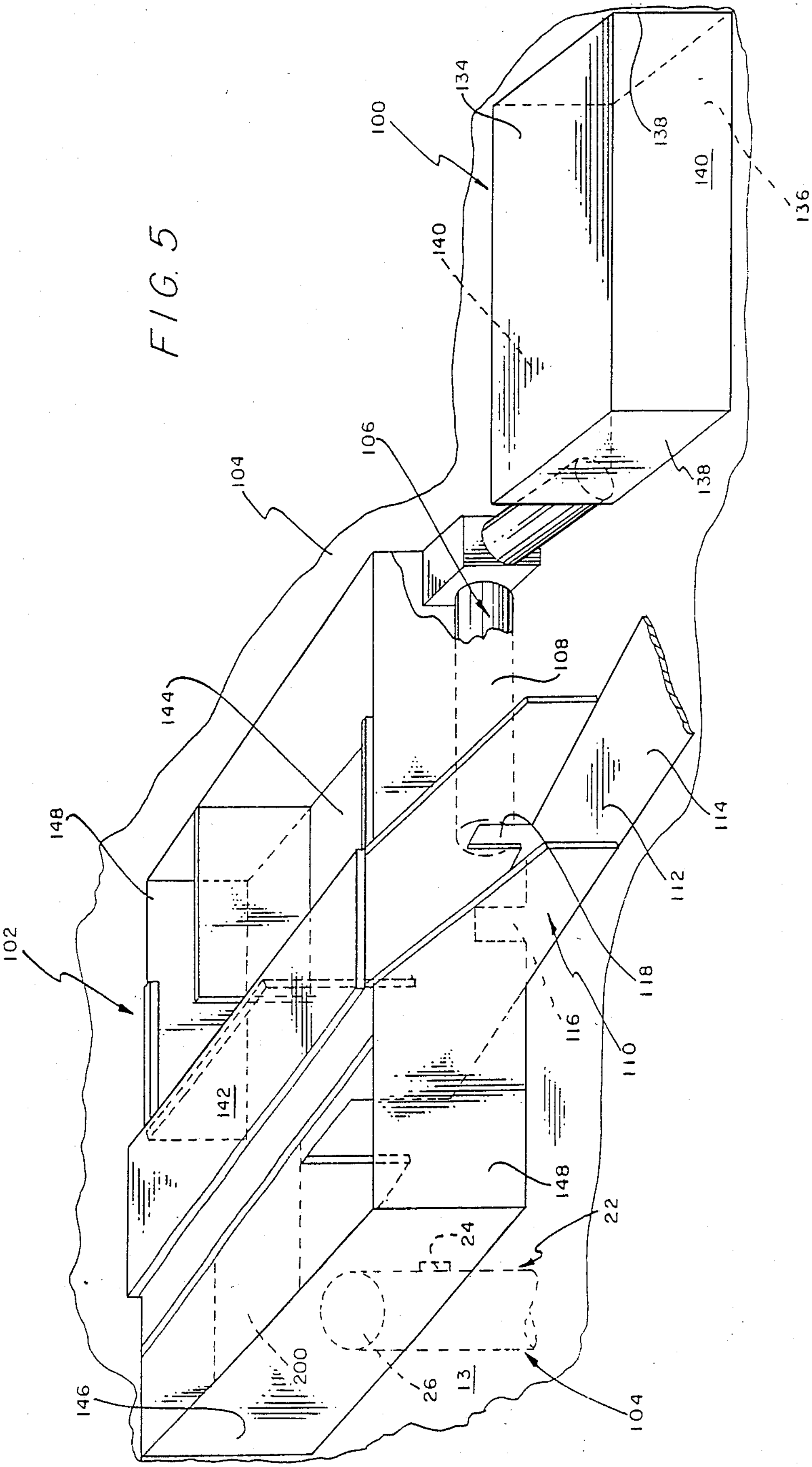
FIG. 5 is a partial perspective view of another embodiment of the invention wherein a pair of above ground housings are interconnected with a tube that has been covered with dirt or debris from the earth.

Referring in detail now to FIG. 5 for another embodiment of the present invention, a housing means, generally illustrated as 100, and a housing means, generally illustrated as 102, are positioned on the ground 104 of the earth. Interconnecting the housing means 102 and 104 is a tunnel housing means, generally illustrated as 106, which communicates with both of the subterranean housing means 102 and 104. Preferably, the tunnel housing means 106 is L-shaped and is covered or inundated with dirt (or debris) 108 from the ground 104.

As is seen in FIG. 1, the housing 102 may be formed with the silo means 22 extending below the housing 102 such that when the silo door means 26 opens, the inside of the housing 102 communicates with the inside of the silo means 22. This embodiment of the invention is represented by dotted lines in FIG. 5. In the latter embodiment of the invention, the pair of housings 100 and 102, along with the tunnel housing 106, would still be disposed above ground with an entrance through a vestibule, generally illustrated as 110. The vestibule 110 has an opening 112 which is accessible via a walkway 114, and a door 116 for entering the housing 102, and a door 118 for entering the tunnel housing means 106.

For the embodiment of the invention where the silo means 22 is disposed underneath the housing 102, the method for disposing of, confining, and isolating toxic waste material would comprise passing toxic waste material through the vestibule 110, and either through the door 118 and through tunnel housing 106 and into the housing 100 for depositing therein, or through door 116 and into housing 102 and into the silo means 22 (which for this embodiment would not include conduit 28) or through door 116 and into housing 102. The door 116 or door 118 would then be closed in order to enclose and confine or isolate the toxic waste material within either the housing 100 (or the tunnel housing 106) or the housing 102 or the silo means 22.

As was seen for FIGS. 1-4, the housing 100 and 104 along with the tunnel housing 106 and the silo means 22 are all also preferably constructed of three- to twelve-foot thick reinforced concrete. The concrete is reinforced with one-inch thick steel rods. As illustrated in FIG. 5, subterranean housing 100 has a roof 134, a floor 136, end walls 138—138, and side walls 140—140. The tunnel housing 106 is cylindrically shaped, preferably L-shaped. The housing 102 similarly has a roof 142, a base 144, a pair of end walls 146—146, and a pair of side walls 148—148. Roof 142 may have a door 200 that can open above the silo 22. Entrance into the housing 102 is through the vestibule means 110 where the door 116 opens to allow entrance from the vestibule means 110 into the housing 102. The vestibule means 110 is also preferably constructed of three- to twelve-foot thick concrete.

As was previously seen for FIGS. 1-4, coating the outside of the silo means 22, and the walls, tops, and bottoms of the subterranean housings 100 and 102, along with the cylindrical walls of the tunnel housing 106, is a composition which preferably comprises refined coal tar or bitumen, along with enamel. The bitumen for this composition also comprises principally hydrocarbons and is substantially free of oxygenated bodies. The bitumen may include both asphalt and coal tar materials. As was indicated, the composition comprises 20% to 80% by weight bitumen and 20% to 80% enamel. The enamel preferably comprises pigments (e.g. iron oxides, etc.) dispersed in varnish or a resin vehicle. The resin vehicle may be an oil-resin mixture, or entirely a synthetic resin. In the event that the coating composition comprises bitumen, varnish, and a synthetic resin, the composition is heated after being supplied to the aforementioned structures.

The housing 100, in addition to having side walls 140—140 and end walls 138—138, additionally comprises the plurality of compartmentalized rooms 52 of the housing 16 in FIG. 2. As was indicated for housing 16, the rooms 52 are separated by the plurality of wall partitions 54 which are interconnected to define the plurality of compartments 52 (see FIG. 2). The housing 100 (as was seen for housing 16) may have other uses prior to depositing, confining, and isolating toxic waste material therein; such other uses include but are not limited to being a habitat where personnel may live and work to launch missiles from the silo means 22. As was previously indicated for housing 16, in the event that the subterranean housing 100 is employed as a habitat for launching missiles, the subterranean housing 100 would also include the compartments 15 as being for launch operations, a mess, etc. As was illustrated for housing 16 in FIG. 2, one of the compartments 52 for housing 100 would include a power plant and mechanical equipment along with various ventilation ducts wherethrough ventilation is conducted to be used for the personnel working in the housing 100. The housing 100, as seen for housing 16, may also include a humidistat and a toilet, as well as a plurality of ducts that are positioned overhead in each of the compartments 52. It is readily apparent that in the event that the housing 100 is employed for depositing, confining, and isolating toxic waste material, such as radioactive material, the ventilation ducts, the toilet, the humidistat, the ducts, etc., will all have to be plugged or stopped or filled in with a suitable filler, such as a concrete mixture. The filler is preferably of the type that is described in U.S. Pat. No. 4,428,700 (i.e., the previously described concrete as being the modified sulphur cement or concrete type which has been placed in a molten state into the various receptacles that are to be filled. As was previously stated, such modified sulphur cement is prepared by mixing together molten sulphur at a temperature of from about 120° C. to about 180° C. and from about 2 wt. % to about 40 wt. % (preferably from about 4 to about 8 wt. %) of a suitable organic modifier. The time that the sulphur and the organic modifier are mixed together is the same previously mentioned time ranging from about one hour to about eight hours, preferably three to five hours. Suitable organic modifiers include the cyclic hydrocarbons; more specifically, the suitable organic modifiers may be selected from the group consisting of dipentene, vinyltoluene, dicyclopentadiene, and mixtures thereof. The resulting modified sulphur cement or concrete product is poured while in the molten state into the appropriate receptacle (i.e., the humidistat, the ducts, the ventilation ducts, the toilet, etc.) and is allowed to cool into a solid. The concrete or the modified sulphur cement is employed to make the subterranean housing 100 airtight with respect to the surrounding atmosphere.

The housing 102 may internally be generally identical to housing 16 and, as best illustrated in FIG. 3, may also contain a plurality of compartmentalized spaces which are defined by the plurality of partitions 54 interconnected to form compartments 52. As was seen for the housing 16 and housing 100, housing 102 may have other uses in addition to being a depository for toxic waste material. As previously indicated, the other uses may be as a housing where missiles may be launched from the silo 22 that is disposed below the housing 102. When used for such purposes of launching missiles, the housing 102 would include the blast or flame pit area 60, the fuel control area 62, the utility tunnel 64 for quick escape, the collimator pit 66, and various concrete pads 68. The housing 102 may additionally include various electrical platforms and the waste water area 72. The housing 102 may additionally include the plurality of stirrups 70 which are formed such as to be embedded in the formation 13 (see Figs. 1 and 5) to give the housing 102 stability.

By the practice of this invention, there are provided structures or housings which meet all EPA and NRC requirements for storage sites. The housings have several entrances which may be employed for different types of toxic material. That is, both bulk type shipments and container type shipments can both be easily accommodated in the housings of this invention. The housings in some embodiments have a singular construction for the exclusion of pests, insects, rodents, and the like. In the preferred embodiment of the housings, they have internal walls or partitions to help contain possible spills. Furthermore, the housings contain or are formed with the ability to be secured from possible intruders, and to accommodate large amounts of weight of toxic material that would be encountered in the storage. Finally, the housings are constructed as described to achieve the desired longevity needed.

While the present invention has been described herein with reference to particular embodiments thereof, a latitude of modification, various changes and substitutions are intended in the foregoing disclosure, and it will be appreciated that in some instances some features of the invention will be employed without a corresponding use of other features without departing from the scope of the invention as set forth.

What is claimed is:

1. A method for the confinement and isolation of toxic waste material comprising the steps of:

(a) forming a first housing means on the surface of the earth, said first housing means having a vestibule means and a silo means extending to the earth and said silo means has a silo door means that can slidably close and open to expose the silo means to the atmosphere;

(b) forming a second housing means on the surface of the earth;

(c) extending a tunnel housing means from said vestibule means of said first housing means to said second housing means; and (d) passing toxic waste material through said vestibule means, through said first housing means, and through said tunnel housing and into said second housing.

2. The method of claim 1 additionally comprising coating said tunnel housing means with a composition comprising bitumen and enamel.

3. The method of claim 2 wherein said composition comprises from about 20 wt. % to about 80 wt. % bitumen.

4. The method of claim 3 wherein said enamel comprises an organic protective coating.

5. The method of claim 4 wherein said organic protective coating comprises varnish.

6. The method of claim 3 wherein said enamel comprises a resin vehicle selected from the group consisting of an oil-resin mixture, synthetic resin, and mixtures thereof.

7. The method of claim 6 additionally comprising heating said composition after coating said tunnel housing.

8. The method of claim 2 additionally comprising forming said silo means with a plurality of stirrup means.

9. The method of claim 8 additionally comprising opening a silo door means to expose the silo means to the inside of said first housing means; passing toxic waste material through and into said silo means; and subsequently closing said silo door means in order to enclose, confine, and isolate said toxic waste material.

10. The method of claim 9 additionally comprising opening a roof door of said first housing to expose the inside of said first housing to the atmosphere.

* * * * *